(12) United States Patent
Zhang et al.

(10) Patent No.: US 10,341,022 B2
(45) Date of Patent: Jul. 2, 2019

(54) OPTICAL PULSE AMPLITUDE MODULATION TRANSMISSION USING DIGITAL PRE-COMPENSATION

(71) Applicant: ZTE Corporation, Shenzhen (CN)

(72) Inventors: Junwen Zhang, Morristown, NJ (US); Jianjun Yu, Basking Ridge, NJ (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/857,477

(22) Filed: Dec. 28, 2017

(65) Prior Publication Data

US 2018/0183521 A1   Jun. 28, 2018

Related U.S. Application Data

(60) Provisional application No. 62/439,855, filed on Dec. 28, 2016.

(51) Int. Cl.
| | |
|---|---|
| *H04B 10/00* | (2013.01) |
| *H04B 10/2525* | (2013.01) |
| *H04B 10/67* | (2013.01) |
| *H04B 10/516* | (2013.01) |
| *H04B 10/2513* | (2013.01) |
| *H04B 10/2543* | (2013.01) |
| *H04B 10/524* | (2013.01) |
| *H04B 10/69* | (2013.01) |

(52) U.S. Cl.
CPC ..... *H04B 10/2525* (2013.01); *H04B 10/2543* (2013.01); *H04B 10/25137* (2013.01); *H04B 10/5161* (2013.01); *H04B 10/524* (2013.01); *H04B 10/676* (2013.01); *H04B 10/697* (2013.01)

(58) Field of Classification Search
USPC .................................................. 398/158, 189
See application file for complete search history.

(56) References Cited

U.S. PATENT DOCUMENTS

| | | | | |
|---|---|---|---|---|
| 7,376,358 B2 * | 5/2008 | Roberts | ............ | H04B 10/25137 398/193 |
| 7,676,161 B2 * | 3/2010 | Roberts | ................ | H04B 10/505 398/192 |
| 7,693,429 B1 * | 4/2010 | Lowery | ................ | H04B 10/548 398/182 |
| 7,787,778 B2 * | 8/2010 | Harley | ............... | H04B 10/5053 398/195 |

(Continued)

OTHER PUBLICATIONS

Dochhan, A., et al., "Solutions for 400 Gbit/s Inter Data Center WDM Transmission," 42nd European Conference and Exhibition on Optical Communications, Dusseldorf, Germany, pp. 680-682, Sep. 2016.

(Continued)

*Primary Examiner* — Agustin Bello
(74) *Attorney, Agent, or Firm* — Perkins Coie LLP

(57) ABSTRACT

At a transmitter-side in an optical communication network, pulse amplitude modulation optical signals to be transmitted are pre-compensated using a chromatic dispersion pre-compensation stage and a device non-linearity pre-compensation stage. The non-linearity pre-compensation may be achieved by using look-up tables that are built based on messages exchanged between the transmitter and a target receiver using known symbol patterns.

20 Claims, 16 Drawing Sheets

(56) References Cited

U.S. PATENT DOCUMENTS

| | | | | |
|---|---|---|---|---|
| 8,879,925 B2* | 11/2014 | Akiyama | H04B 10/588 | 398/184 |
| 8,909,061 B1* | 12/2014 | Varadarajan | H04B 10/6161 | 398/159 |
| 9,160,456 B2* | 10/2015 | Liu | H04B 10/58 | |
| 9,178,617 B2* | 11/2015 | Kikuchi | H04B 10/2507 | |
| 9,912,500 B2* | 3/2018 | Yu | H04B 10/0799 | |
| 2004/0197103 A1* | 10/2004 | Roberts | H04B 10/2543 | 398/159 |
| 2006/0024062 A1* | 2/2006 | Jakober | H04B 10/505 | 398/141 |
| 2006/0127102 A1* | 6/2006 | Roberts | H04B 10/505 | 398/182 |
| 2007/0092265 A1* | 4/2007 | Vrazel | H04B 10/5161 | 398/189 |
| 2008/0232820 A1* | 9/2008 | Burchfiel | H04B 10/505 | 398/183 |
| 2009/0238580 A1* | 9/2009 | Kikuchi | H04B 10/25137 | 398/192 |
| 2009/0257755 A1* | 10/2009 | Buelow | H04B 10/505 | 398/184 |
| 2010/0046958 A1* | 2/2010 | Awadalla | H04B 10/25137 | 398/149 |
| 2010/0111531 A1* | 5/2010 | Tanimura | H04B 10/5055 | 398/65 |
| 2010/0247099 A1* | 9/2010 | Lowery | H04B 10/2543 | 398/79 |
| 2010/0284695 A1* | 11/2010 | Lin | H04B 10/2513 | 398/81 |
| 2011/0236033 A1* | 9/2011 | Kikuchi | H04B 10/50 | 398/183 |
| 2011/0255876 A1* | 10/2011 | Sugihara | H04B 10/5053 | 398/188 |
| 2011/0305457 A1* | 12/2011 | Kikuchi | H04B 10/5055 | 398/65 |
| 2012/0007756 A1* | 1/2012 | Agazzi | H03M 1/0624 | 341/118 |
| 2012/0134676 A1* | 5/2012 | Kikuchi | H04B 10/532 | 398/65 |
| 2012/0201546 A1* | 8/2012 | Mizuochi | H04B 10/25137 | 398/147 |
| 2012/0281988 A1* | 11/2012 | Kikuchi | H04B 10/5561 | 398/159 |
| 2012/0288284 A1* | 11/2012 | Yoshida | H04B 10/5053 | 398/186 |
| 2012/0301157 A1* | 11/2012 | Qian | H04B 10/25133 | 398/192 |
| 2013/0108276 A1* | 5/2013 | Kikuchi | H04B 10/677 | 398/158 |
| 2013/0136449 A1* | 5/2013 | Liu | H04B 10/2507 | 398/65 |
| 2014/0147117 A1* | 5/2014 | Kikuchi | H04B 10/2507 | 398/65 |
| 2015/0117869 A1* | 4/2015 | Wakayama | H04B 10/5053 | 398/185 |
| 2015/0139649 A1* | 5/2015 | Kikuchi | H04J 14/06 | 398/65 |
| 2015/0270921 A1* | 9/2015 | Jia | H04B 10/6165 | 398/25 |
| 2016/0099775 A1* | 4/2016 | Liu | H04B 10/2507 | 398/115 |
| 2016/0204822 A1* | 7/2016 | Yu | H04B 1/40 | 375/219 |
| 2017/0149503 A1* | 5/2017 | Liu | H04B 10/2507 | |
| 2017/0163350 A1* | 6/2017 | Chien | H04B 10/6162 | |
| 2017/0180055 A1* | 6/2017 | Yu | H04B 10/612 | |
| 2018/0183521 A1* | 6/2018 | Zhang | H04B 10/2525 | |
| 2018/0266917 A1* | 9/2018 | Chen | G01M 11/3109 | |

OTHER PUBLICATIONS

Eiselt, N., et al., "First Real-Time 400G PAM-4 Demonstration for Inter-Data Center Transmission over 100 km of SSMF at 1550 nm," Optical Fiber Communication Conference, OSA Technical Digest (online) (Optical Society of America, 2016), Anaheim, California, USA, Paper W1K.5, Mar. 2016.

Gao, Y., et al., "112 Gb/s PAM-4 Using a Directly Modulated Laser with Linear Pre-Compensation and Nonlinear Post compensation," 42nd European Conference and Exhibition on Optical Communications, Dusseldorf, Germany, pp. 121-123, Sep. 2016.

Ke, J., et al., "400 Gbit/s single-carrier and 1 Tbit/s three-carrier superchannel signals using dual polarization 16-QAM with look-up table correction and optical pulse shaping," Optics Express, 22(1):71-83, Jan. 2014.

Pang, X., et al., "Evaluation of High-Speed EML-based IM/DD links with PAM Modulations and Low-Complexity Equalization," 42nd European Conference and Exhibition on Optical Communications, Dusseldorf, Germany, pp. 372-874, Sep. 2016.

Sadot, D., et al., "Single channel 112Gbit/sec PAM4 at 56Gbaud with digital signal processing for data centers applications," Optics Express, 23(2):991-997, Jan. 2015.

Zhou, J., et al., "Transmission of 100-Gb/s DSB-DMT over 80-km SMF Using 10-G class TTA and Direct-Detection," 42nd European Conference and Exhibition on Optical Communications, Dusseldorf, Germany, pp. 421-423, Sep. 2016.

* cited by examiner

OPTICAL PULSE AMPLITUDE MODULATION TRANSMISSION USING DIGITAL PRE-COMPENSATION

CROSS REFERENCE TO RELATED APPLICATIONS

This patent document claims the benefit of priority of U.S. Provisional Patent Application No. 62/439,855, filed Dec. 28, 2016. The entire content of the before-mentioned patent application is incorporated by reference as part of the disclosure of this document.

TECHNICAL FIELD

This patent document relates to digital communication, and, in one aspect, multi-carrier optical communication systems.

BACKGROUND

There is an ever-growing demand for data communication in application areas such as wireless communication, fiber optic communication and so on. The demand on core networks is especially higher because not only are user devices such as smartphones and computers using more and more bandwidth due to multimedia applications, but also the total number of devices for which data is carried over core networks is increasing. For profitability and to meet increasing demand, equipment manufacturers and network operators are continually looking for ways in which operational and capital expenditure can be reduced.

SUMMARY

The present document discloses techniques for pre-compensation of transmitted signal by transmitters and reception of pre-compensated signals by receivers, when the signal is transmitted using pulse amplitude (PAM) modulation format.

In one example aspect, a method of digital communication, implementable at a transmitter side in a digital communication network, is disclosed. The method includes receiving information bits at an input interface, mapping the information bits to a sequence of pulse amplitude modulation (PAM) symbols, generating non-linearity pre-compensated data by applying non-linearity pre-compensation to the sequence of PAM symbols, generating chromatic dispersion pre-compensated data by applying chromatic dispersion pre-compensation to the non-linearity pre-compensated data, converting the chromatic dispersion pre-compensated data from digital domain to analog domain using a digital to analog conversion circuit, using an output of the digital to analog conversion circuit for performing I-Q modulation of a light source, and transmitting, over an optical transmission medium, an output signal resulting from the I-Q modulation of the light source.

In another example aspect, an optical communication transmission apparatus is disclosed. The apparatus includes an input interface capable of receiving information bits, a memory capable of storing instructions and a look-up table, and a processor capable of reading the instructions from the memory and implementing a method comprising mapping the information bits to a sequence of pulse amplitude modulation (PAM) symbols, generating non-linearity pre-compensated data by applying non-linearity pre-compensation to the sequence of PAM symbols, generating chromatic dispersion pre-compensated data by applying chromatic dispersion pre-compensation to the non-linearity pre-compensated data, a digital to analog conversion circuit capable of converting the chromatic dispersion pre-compensated data from digital domain to analog domain, an I-Q modulator capable of using an output of the digital to analog conversion circuit for performing I-Q modulation of a light source, and an optical transmission front end capable of transmitting, over an optical transmission medium, an output signal resulting from the I-Q modulation of the light source.

In another example aspect, a method of optical communication, performed at an optical signal receiver apparatus is disclosed. The method includes, during a first stage of operation, receiving an optical pulse amplitude modulation (PAM) signal from an optical transmitter apparatus over an optical transmission medium, wherein the optical PAM signal comprises one or more known symbol patterns, extracting symbol estimates from the optical PAM signal by performing direct detection, determining an error component by comparing the symbol estimates with the one or more known symbol patterns, averaging the error component to build a look-up table indicative of a pre-compensation correction to mitigate the error component, and transmitting the look-up table to the optical transmitter apparatus.

In yet another aspect, an optical communication receiver apparatus is disclosed. The apparatus includes an optical network interface capable of receiving optical pulse amplitude modulated (PAM) signal and a processor programmed to implement the above-described receiver-side optical communication method using the received optical PAM signal.

These, and other aspects, are disclosed in the present document.

DETAILED DESCRIPTION

In order to continue to satisfy the demand for rapidly growing data center traffic, 400G data transmission based on compact, low-cost transceivers have been proposed for the next-generation intra- or inter data-center-interconnections (DCI) applications.

In particular, the inter-DCI applications are required to support links with typical transmission distances up to 80 km. Recently, the intensity modulation and direct-detection (IM/DD) system based on PAM-4 signals has been selected by IEEE 802.3bs Task Force as the standard of the next generation 400 GbE over single mode fiber for client optics. The IEEE 802.3bs standard, however, is designed primarily for use in distances of 10 km or shorter, such as found inside a data center facility. For such transmission distances, data transmission distortions, such as chromatic dispersion (CD), can be overcome by using single side band spectrum, such as is specified by the IEEE 802.3bs standard. However, for longer transmission distances, impairments due to CD may further degrade the performance of the transmission system.

Pulse-amplitude modulation (PAM) signals have attracted lots of research interest from both industry and academia as the modulation formats for next generation high-speed data connection links. For these systems, direct-detection is more attractive due to the lower system cost and power consumption.

However, for high-speed PAM signals carried by optical signals at C-band (around 1550-nm), the main challenge is the frequency-related power fading induced by the CD after direct detection. On the other hand, the nonlinearity (NL) impairments caused by modulators and the interplays between residual chromatic dispersion and direct-detection process will further degrade system performance.

The techniques disclosed in the present document solve these problems, among other things, by performing digital chromatic dispersion compensation and nonlinear impairments pre-compensation for the PAM direct-detection and fiber transmission system. A optical in-phase and quadrature (I/Q) modulator is used for digital pre-compensated PAM signals modulation.

Figure 1:
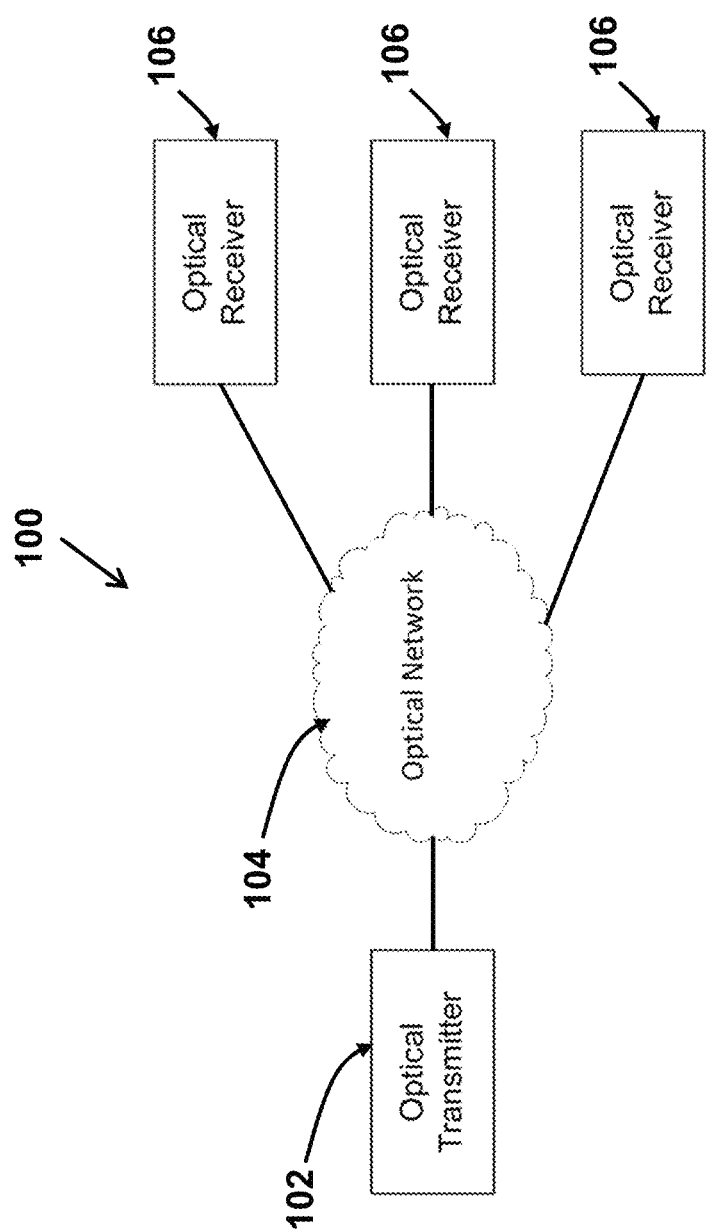
FIG. 1 is a block diagram of an example optical communication network.

FIG. 1 depicts an optical communication system 100 in which the presently disclosed technology can be practiced. One or more optical transmitters 102 are communicatively coupled via an optical network 104 with one or more optical receivers 106. The optical network 104 may comprise optical fibers that extend in length from several hundred feet (e.g., last mile drop) to several thousands of kilometers (long haul networks). The transmitted optical signals may go through intermediate optical equipment such as amplifiers, repeaters, switch, etc., which are not shown in FIG. 1 for clarity. The techniques described in the present document may be implemented by the optical transmitter 102 and/or the optical receivers 106.

Figure 2:
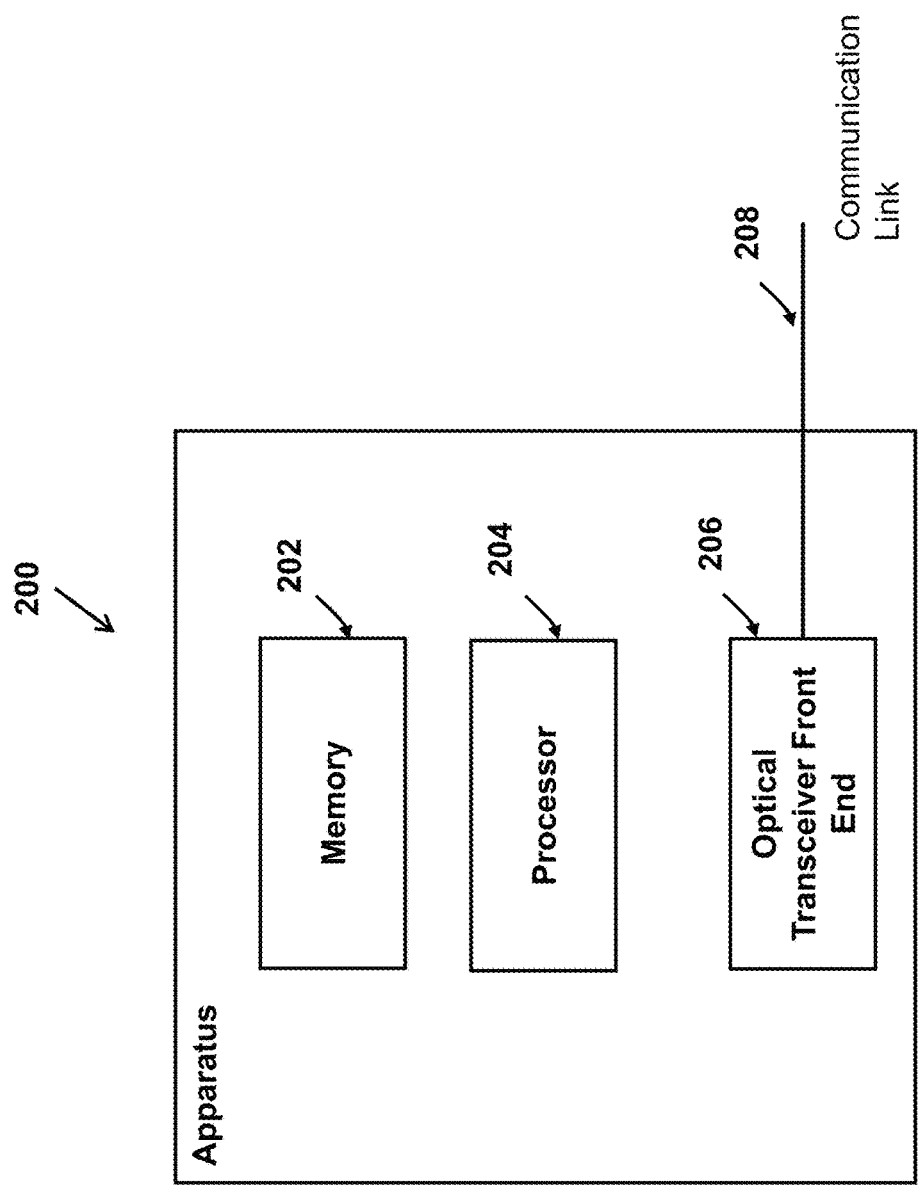
FIG. 2 is a block diagram of an example communication apparatus.

FIG. 2 is a block diagram of an example communication apparatus 200. The apparatus 200 may include one or more memories 202, one or more processors 204 and an optical receiver or transceiver front end 206 that is coupled with a communication link 208. The memory 202 may store processor-executable instructions and/or data during processor operation. The processor 204 may read instructions from the one or memories 202 and implement a technique described in the present document. The optical front end may be coupled to the processor and may receive transmissions from the communication link 208 and convert them into digital signals that are then processed by the processor 204 or other circuitry in the apparatus 200 (not shown in FIG. 2). The apparatus 200 may represent embodiment of the transmitter 102 or the receiver 106 and may be capable of implementing methods 1400 and 1500 described herein.

Figure 3:
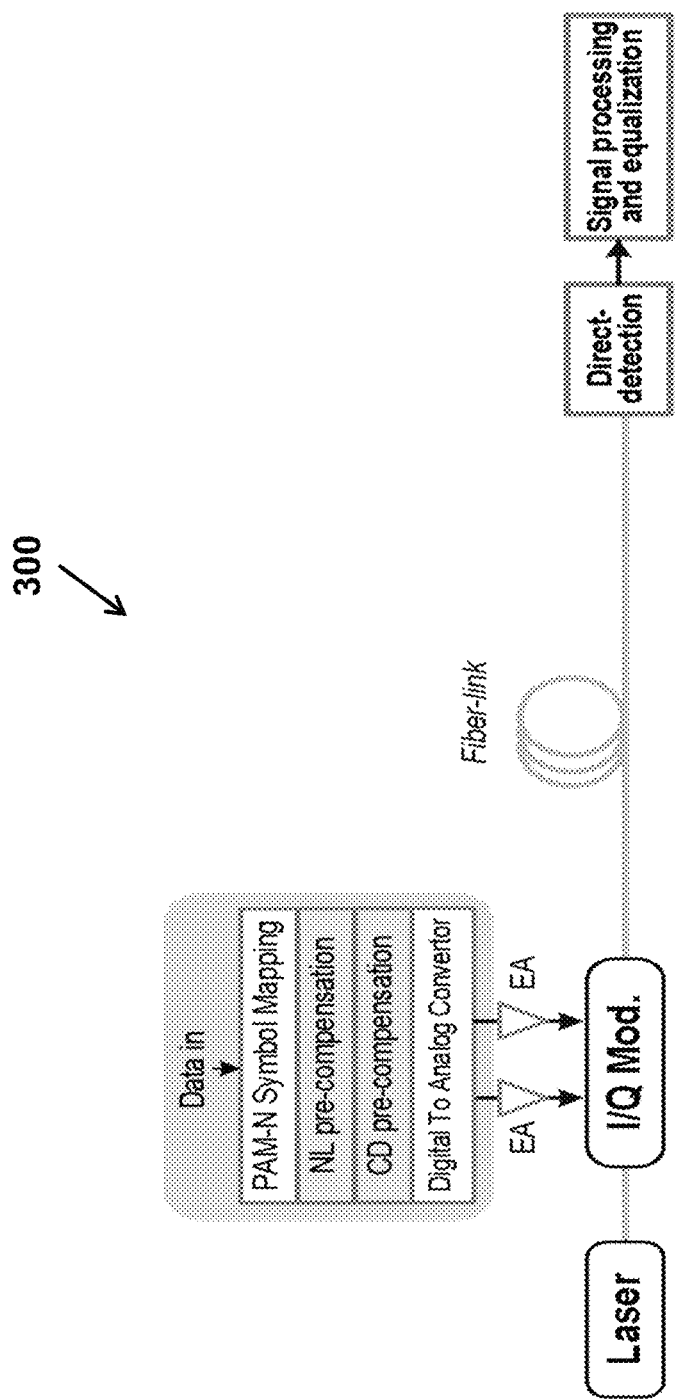
FIG. 3 is a block diagram of an example implementation of an optical transmitter.

FIG. 3 is a block diagram of an example implementation of an optical transmitter 300. The transmitter 300 may receive data. The data may be information bits such as user data, or control data generated by one or more users of the optical communication network. The data may be input to an input of a PAM-N symbol mapping module. The PAM-N symbol mapping module may map the input data to N-level PAM symbols.

The main differences from other PAM intensity modulation systems is that the transmitter 300 uses an I/Q modulator for double side-band signal modulation based on digital NL pre-compensation and CD pre-compensation. The PAM symbols may be output at an output terminal of the PAM-N symbol mapping module that may be connected to an input terminal of an NL pre-compensation module. The NL pre-compensation module may perform non-linear pre-compensation as described herein and may output an NL-pre-compensated output at an output terminal thereof. The NL-pre-compensated output may be input to a CD pre-compensation module which may perform CD pre-compensation on the NL-pre-compensated output to generate a CD-pre-compensated PAM symbol stream.

The CD pre-compensation will change the real PAM signal to a complex signal with both I and Q components. Therefore, I/Q modulator is used for modulation. The modulated optical signal is a double-side-band modulated signal. Prior to modulation, the PAM stream may be converted from digital domain to analog using a DAC circuit. A laser source signal may be I/Q modulated by optionally amplifying the DAC output through an electrical amplifier (EA) and transmitted over a transmission link such as a fiber optic transmission medium. On the receiver side, embodiments may use direct detection, followed by signal processing and equalization, to recover the information bits from the received signal.

The NL pre-compensation may be based on a look-up table (LUT) technique. The LUT may be devised to tailor to fiber transmission. The pre-compensation may be based on a single LUT that is dependent on the transmission channel between one transmitter and multiple receivers, or it may be based on multiple LUTs that are used in an optical network, with each transmitter-receiver having its own LUT.

In order to handle the linear (CD) and nonlinear impairments, the LUTs for pre-compensation may be obtained using the following steps.

1. Do the CD pre-compensation first without NL pre-compensation.

2. Based on the received signals (with Step 1's CD pre-compensation) after fiber transmission, create a table for LUT-based NL pre-compensation. This table may be conveyed from the receiver to the transmitter.

3. Transmit the PAM signals with both NL pre-compensation and CD pre-compensation as shown in the FIG. 3.

Examples of CD Pre-Compensation

Figure 4:
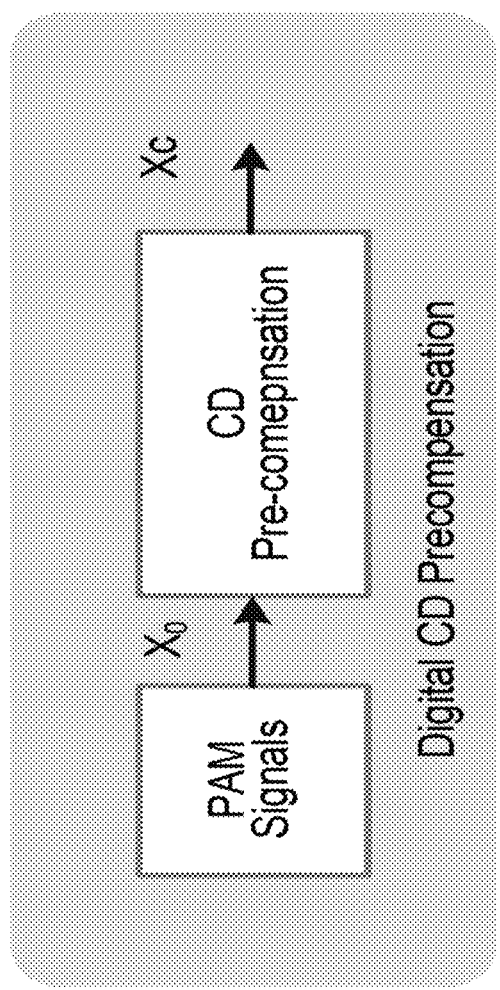
FIG. 4 is a block diagram of an example implementation of pre-compensation stage at in an optical transmitter.

FIG. 4 is a block diagram of an example implementation of pre-compensation stage at in an optical transmitter.

The CD Pre-Compensation can be done in time-domain or frequency domain. The following two equations may be used when performing CD pre-compensation and determining the amount of CD pre-compensation:

$$H(f) = \exp\left\{j\frac{\lambda^2}{4\pi c}DL(2\pi f)^2\right\} \quad (1)$$

$$Xc(f) = Xo(f) * H(f)^{-1} = Xo(f) * \exp\left\{-j\frac{\lambda^2}{4\pi c}DL(2\pi f)^2\right\} \quad (2)$$

Eq. 1 represents the transfer function of the CD in fiber transmission. Therefore, the CD pre-compensation is ideally the inverse of Eq. 1, which may be carried out in the transmitter-side based on digital signal processing.

The CD pre-compensation in frequency domain is shown in Eq. 2. As depicted in FIG. 4, initially, known PAM signals may be used to generate LUT tables. Once the tables are learned, then PAM signal output $X_0$ may be input to the CD pre-compensation stage to generate the CD pre-compensated output $X_c$.

In Equations 1 and 2, $\lambda$ is wavelength of light, c is the speed of light, D is a dispersion parameter of fiber, L is a fiber transmission distance (length of the optical transmission medium), and f represents frequency.

The Bias of I/Q Modulator

Figure 5:
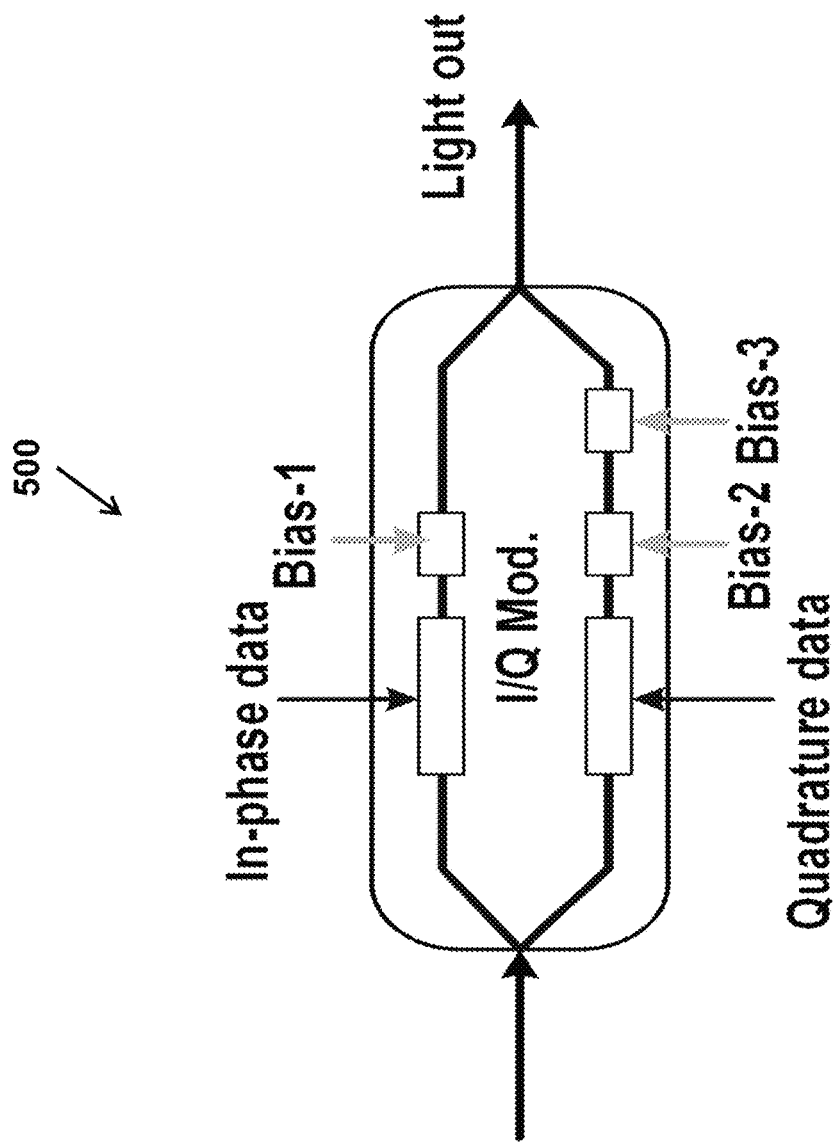
FIG. 5 is a block diagram of an example implementation of a pre-compensation technique.

FIG. 5 is a block diagram depiction of an example embodiment of an IQ modulation module used on the transmitter side. In order to have intensity modulation for PAM signals, the bias of each arm should be set properly. As shown, two different biases may be applied to the Q signal while a single bias may be applied to the I signal.

The biases Bias-1 and Bias-2 may be set at a quarter-wave voltage (Vπ/4), to compensate for cosine response of the IQ modulation, such that the total response becomes linear. The Bias-3 may be set to be a value that makes the upper and lower arms have 90° phase difference (π/2 phase shift).

Figure 6:
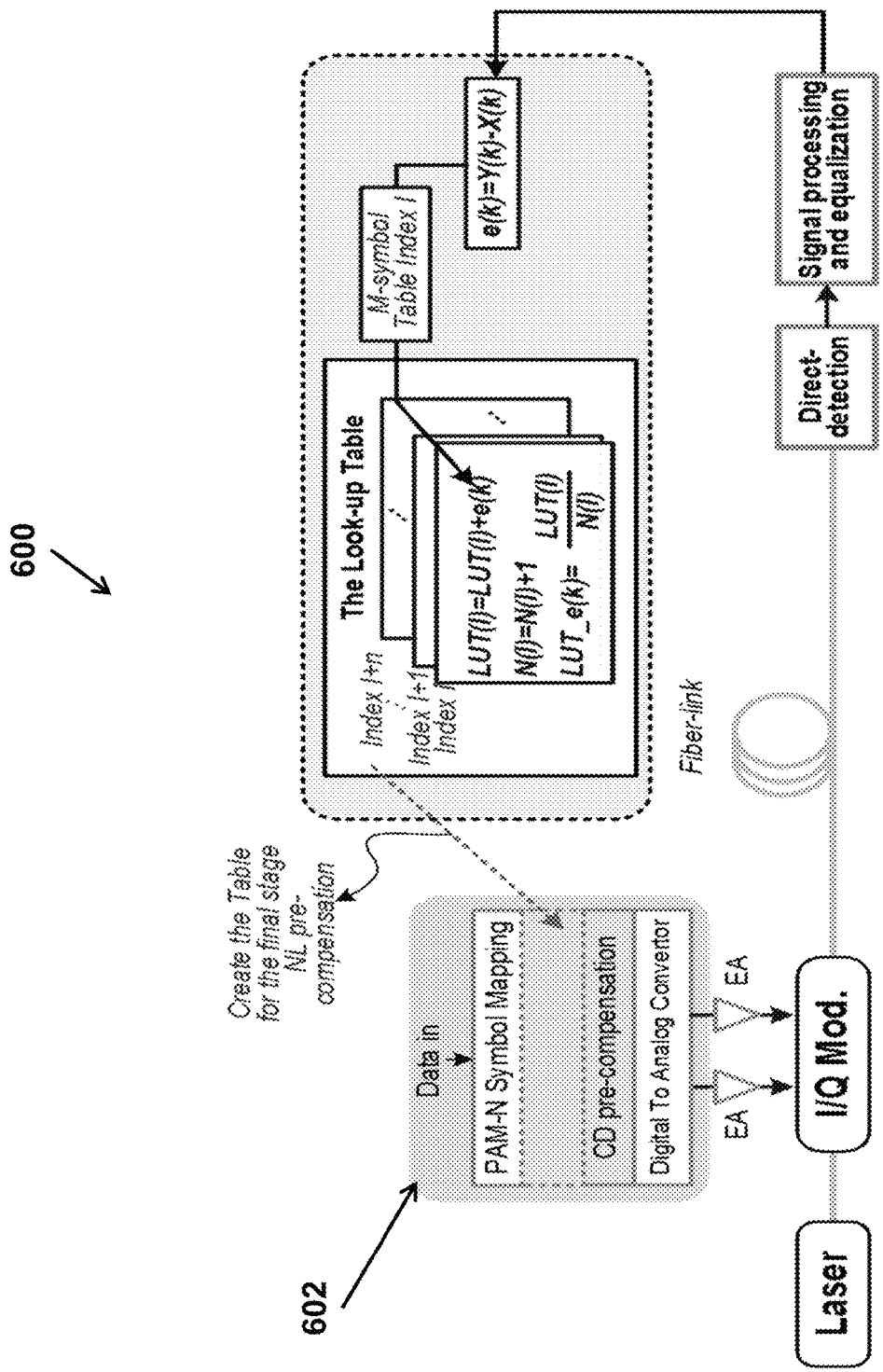
FIG. 6 is a block diagram depiction of an example implementation for generating look-up tables (LUT) for non-linear compensation.

FIG. 6 is a block diagram depiction of an example implementation 600 for generating look-up tables (LUT) for non-linear compensation. As shown on the transmitter-side 602, while learning NL LUTs, the transmitter 602 may perform CD pre-compensation only, with no NL pre-compensation being performed. Embodiments may first generate a pattern dependent table through comparing the transmitted signal with the corresponding recovered ones, under different pattern sequences with length of M symbols.

The LUT corrections are first calculated by the error function e(k), which is the difference between the transmitted PAM symbols real and imaginary parts X(k) and the recovered ones Y(k) at the receiver-side. These entries are stored under different table indexes (I) and finally averaged for transmitter-side pre-distortion as LUT_e(k). During the learning phase, the transmitted PAM symbols may be known to the receiver ahead of time.

Once the look-up table is created with all the possible pattern sequences, the pre-distortion can be employed at the transmitter-side by searching the table by the pattern indexes (I), and doing the correction based on the LUT.

The LUT correction output is XL(k)=X(k)−LUT_e(k), where XL(k) is the output, X(k) is input original PAM symbols and e(k) is the error for the symbol and LUT_e(k) is the stored value by the table index (I).

Figure 7:
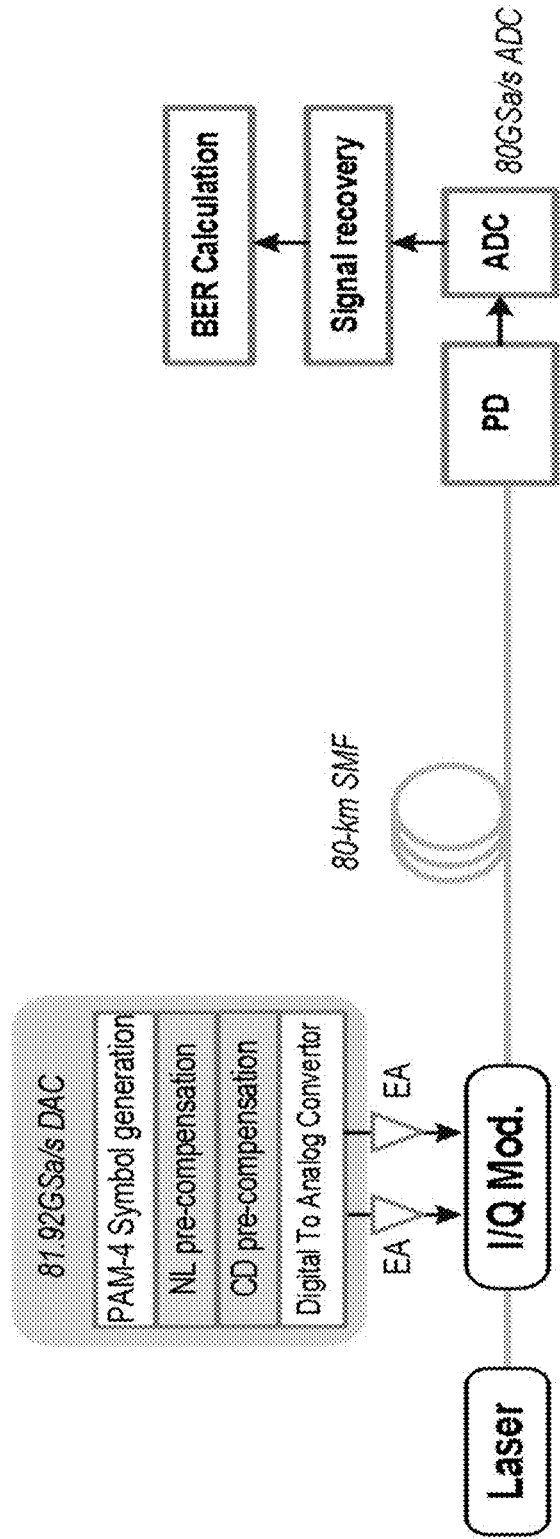
FIG. 7 is a block diagram of an end to end optical communication system embodiment.

FIG. 7 is a block diagram of an end to end optical communication system embodiment. The depicted embodiment includes a DAC working at 81.92 Gsa/s for PAM-4 signal generation and both NL and CD pre-compensation are applied. After 80-km fiber transmission, the BER performance is tested, and compare the results with those without CD pre-compensation or NL pre-compensation.

At the receiver, the signal received over the single mode fiber (SMF) is directly detected by a photo-detector and sampled by an 80 GSa/s ADC for receiver-side signal recovery and processing. BER calculation is performed using known transmitted signal data.

Figure 8:
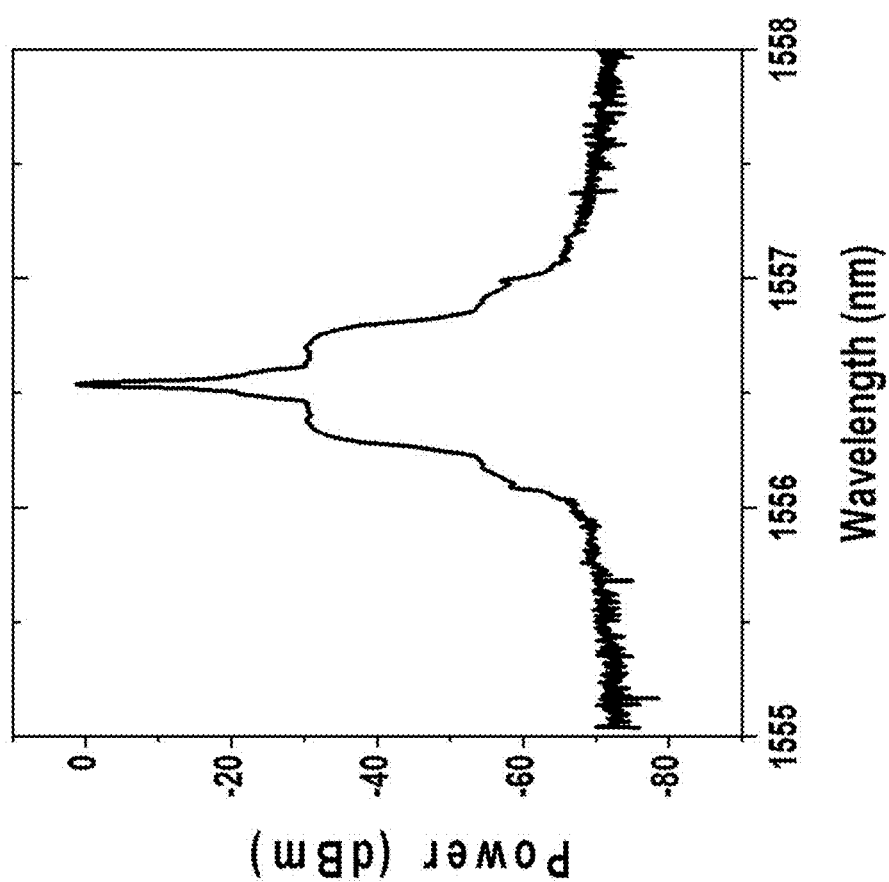
FIG. 8 is a graph showing power spectrum in some embodiments.

FIG. 8 is a graph showing an optical spectrum of 112 Gb/s PAM-4 signal (56 GBaud) used in some experimental embodiments.

Figure 9:
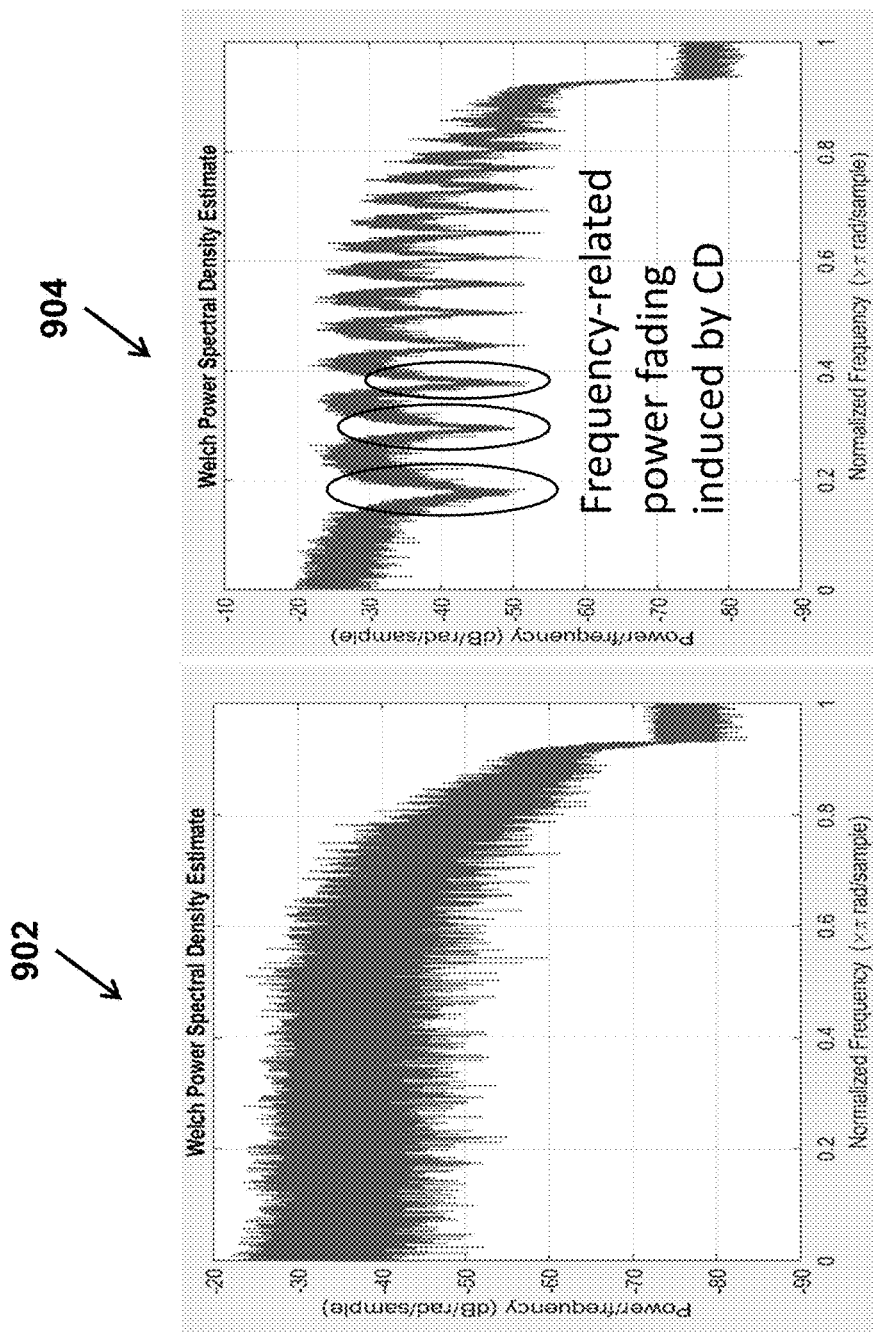
FIG. 9 shows graphs of electrical spectrum of an example of PAM signal and spectrum of the same signal after having gone through a fiber channel.

FIG. 9 shows graphs of electrical spectrum of an example of PAM signal (902) and spectrum of the same signal after having gone through a fiber channel (904).

The electrical spectrum for the PAM signal without CD pre-compensation is shown in graph 902. A corresponding electrical spectrum after 80-km fiber transmission is shown in graph 904. It can be seen on the right-hand side graph that, after 80-km fiber transmission, the signal is severely impaired by the frequency-related power fading induced by CD, the BER after 80-km is 0.5.

Figure 10:
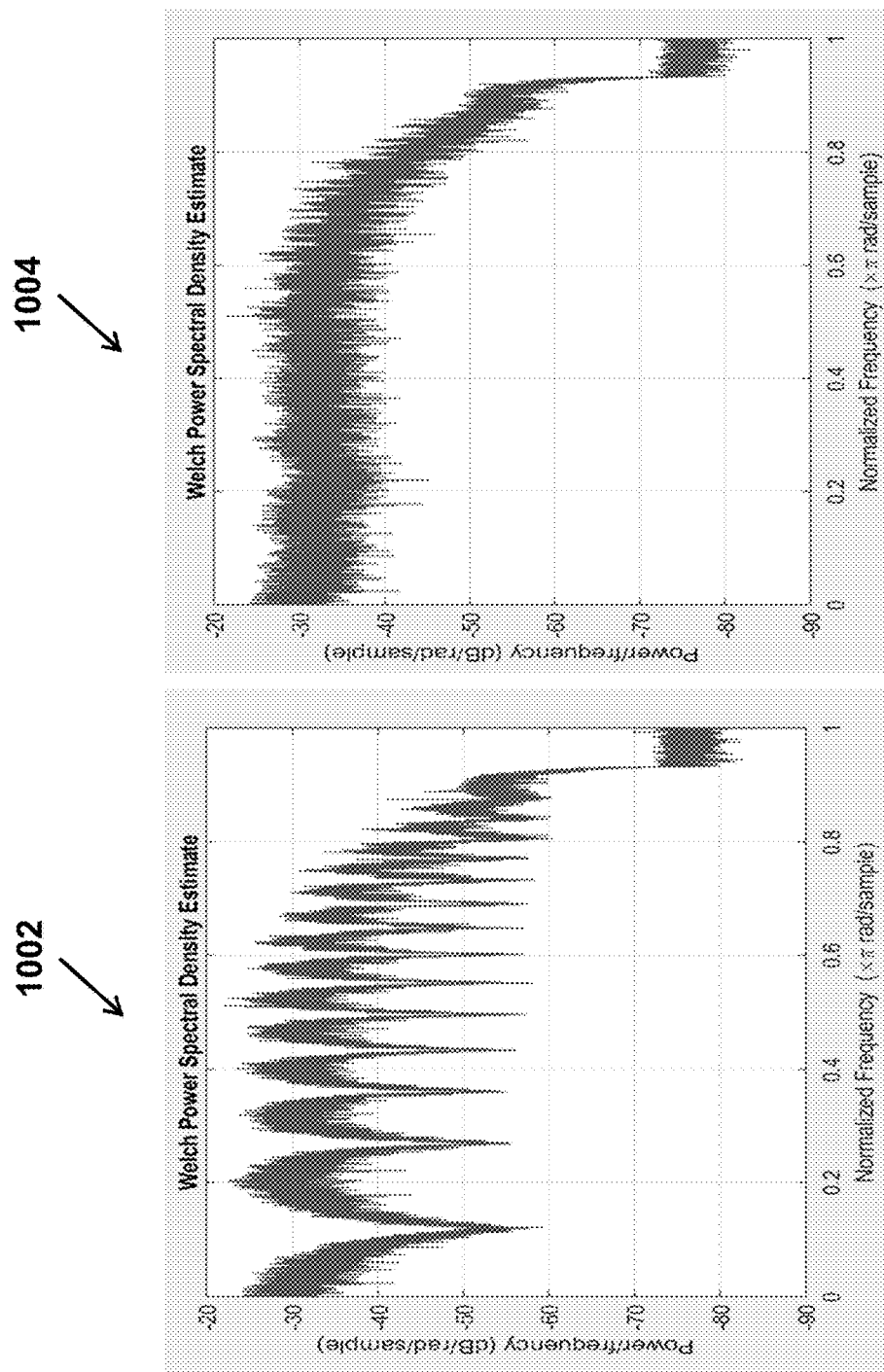
FIG. 10 shows graphs of electrical spectrum of an example of a pre-compensated PAM signal and spectrum of the same signal after having gone through a fiber channel.

FIG. 10 shows graphs of electrical spectrum of an example of a pre-compensated PAM signal (1002) and spectrum of the same signal after having gone through a fiber channel (1004).

The graphs show the Electrical spectrum for the PAM signal with CD pre-compensation before (1002) and after (1004) 80-km fiber transmission.

As can be seen from FIG. 10, the signal is first pre-distorted and then after fiber transmission, the power fading is mitigated.

Figure 11:
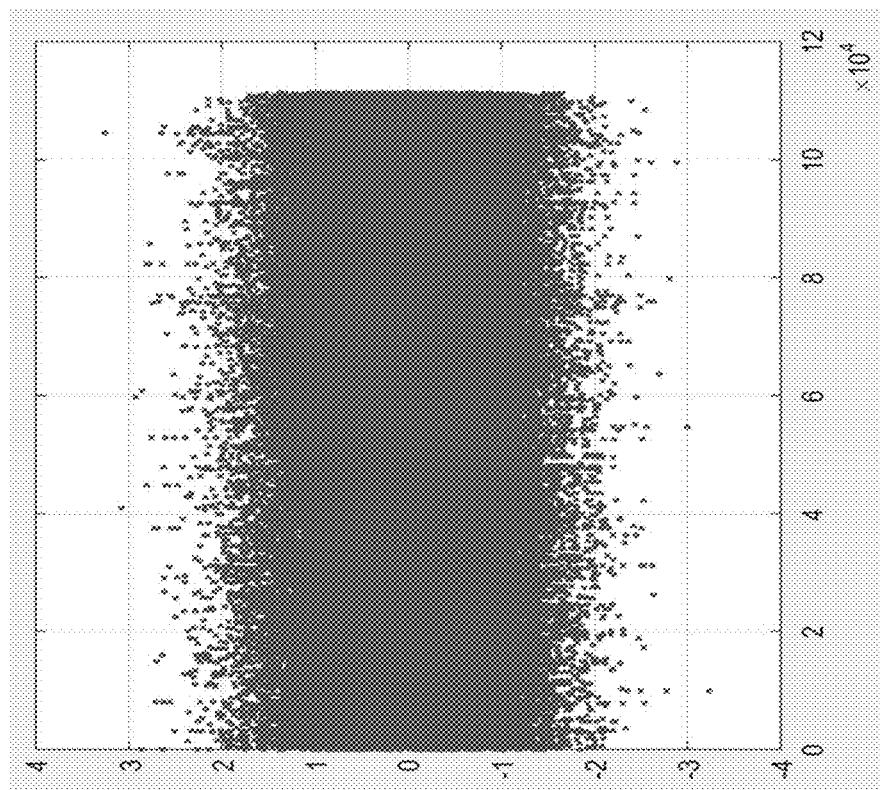
FIG. 11 shows results of bit error rate (BER) measurements in one embodiment.
Figure 12:
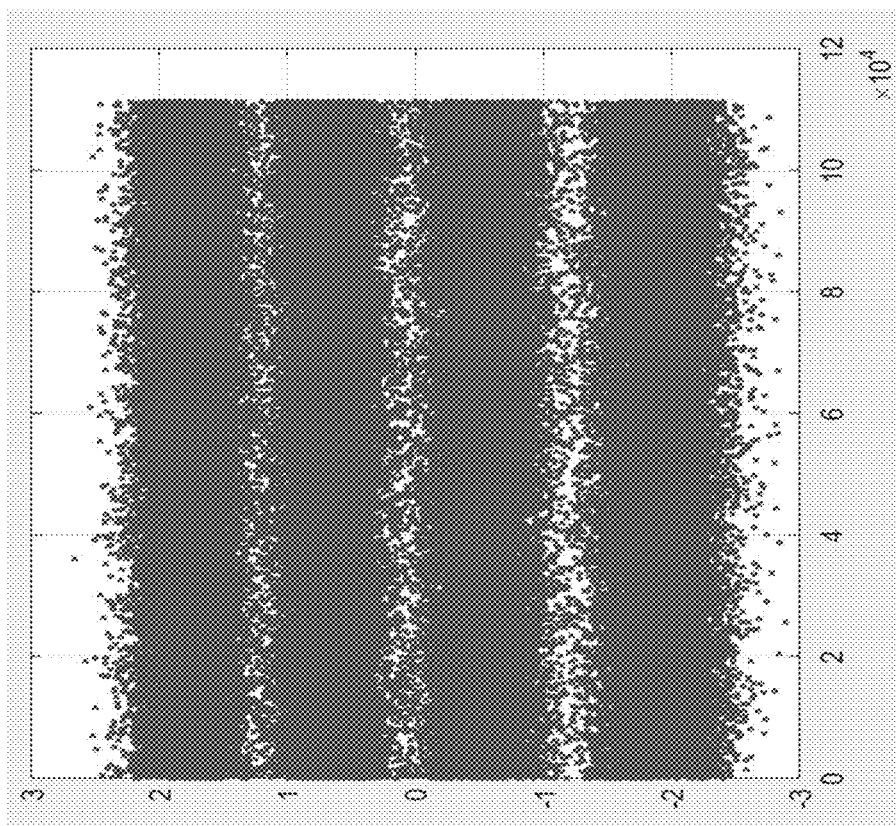
FIG. 12 shows results of bit error rate (BER) measurements in one embodiment.
Figure 13:
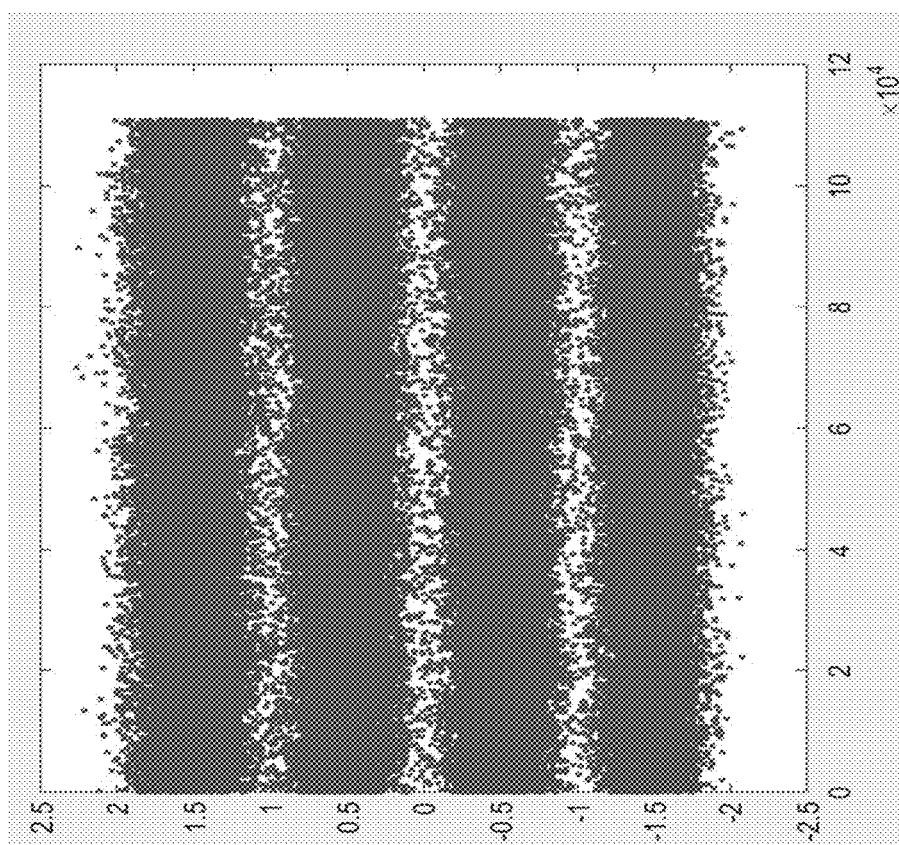
FIG. 13 shows results of bit error rate (BER) measurements in one embodiment.

FIG. 11, FIG. 12 and FIG. 13 show examples of BERs of 112 Gb/s PAM-4 signals after 80-km fiber transmission.

FIG. 11 shows results of bit error rate (BER) measurements in one embodiment in which BER of 0.5 is obtained. No pre-compensation is applied in this case.

FIG. 12 shows results of bit error rate (BER) measurements in one embodiment in which CD pre-compensation only is used. A BER of 4.4e-3 was measured.

FIG. 13 shows results of bit error rate (BER) measurements in one embodiment with both NL and CD pre-compensation. The measured BER was about 1.1e-3.

Figure 14:
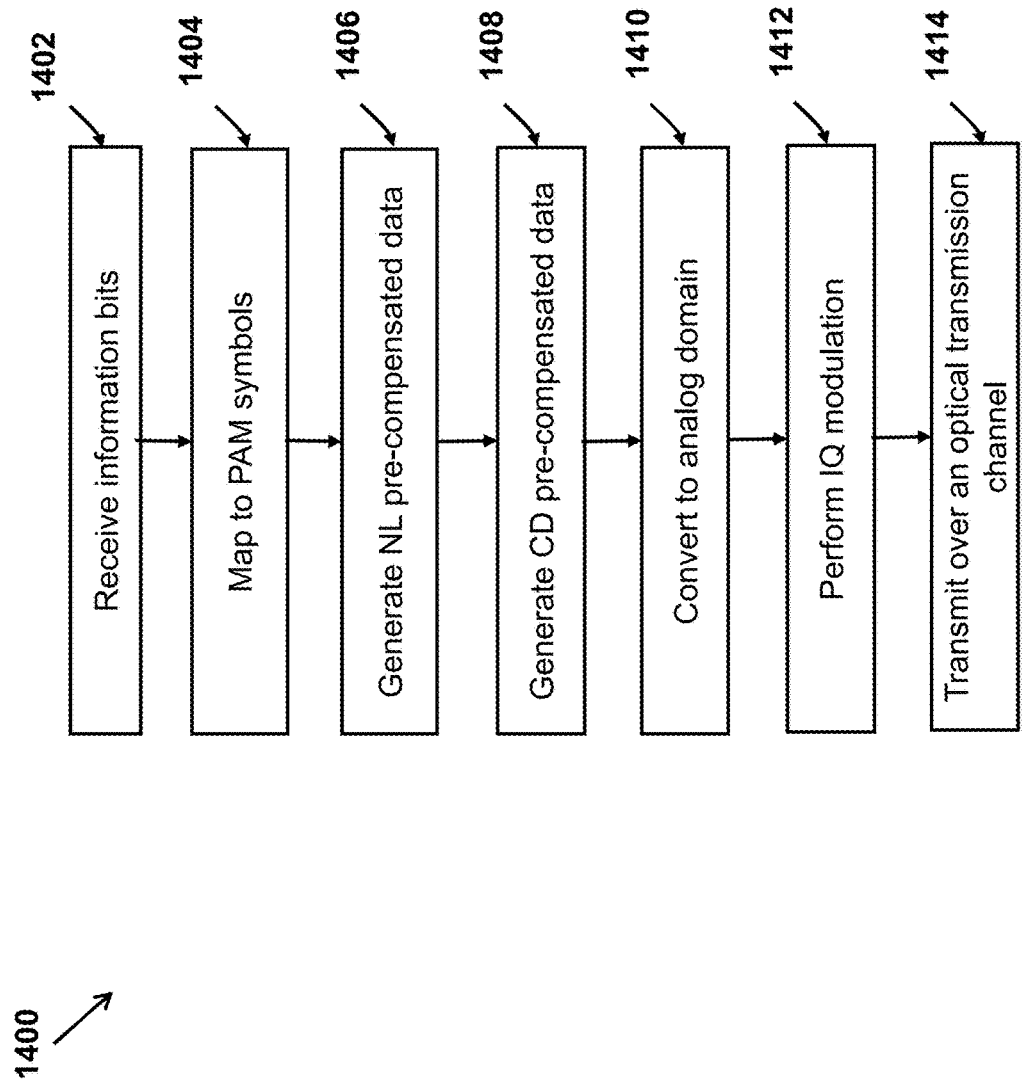
FIG. 14 is a flowchart for an example method of optical communication.

FIG. 14 is a flowchart for an example method 1400 of optical communication.

The method 1400 includes receiving (1402) information bits at an input interface. The information bits may represent locally generated data or may be data received from other user devices and network equipment via a data peripheral bus. The locally generated data may include application layer data and/or user data, control data, and such. Similarly, data received via the peripheral bus may represent network traffic which generally includes both user data and control data of the optical communication network.

The method 1400 includes mapping (1404) the information bits to a sequence of pulse amplitude modulation (PAM) symbols. In general, multiple levels (N levels, N>2) of amplitude are used for high order PAM signal modulation.

The method 1400 includes an operation of generating (1406) non-linearity pre-compensated data by performing an operation of applying non-linearity pre-compensation to the sequence of PAM symbols. In some embodiments, the operation of applying the non-linearity pre-compensation may include the use of a look-up table in which, for a given PAM symbol in the sequence of PAM symbols, an index to the look-up table is identified and then value of the PAM symbol is revised based on the index. In some embodiments, the revision of value may be performed by additively adjusting the amplitude of the analog I and Q signals used to generate the PAM symbol. For example, revising the value of the given PAM symbols may be performed by subtracting an error term from the given PAM symbol. Alternatively or in addition, the non-linearity correction may be applied as a corrective scale factor to the original signal value and the scaled signal may be used for mapping to a PAM level.

As described herein, in some embodiments, the look-up table may be generated by the transmitter by exchanging messages with a receiver during a training phase. In some embodiments, the transmitter may maintain a single look-up table that is used for adjusting values of transmitted PAM symbols to multiple optical receivers that generally have a same optical communication channel with the transmitter. Alternatively, the transmitter may generate individualized, or custom, look-up table for each receiver based on a training phase in which the transmitter transmits one or more known symbol patterns by performing chromatic dispersion pre-compensation on the known symbol pattern and without performing non-linearity pre-compensation, and receiving, from the receiver, entries of the look-up table derived by processing the one or more known symbol patterns. The transmitter may store the one or more look-up tables in a local memory for future use after the training phase during data transmission.

The method 1400 includes generating (1408) chromatic dispersion pre-compensated data by applying chromatic dispersion pre-compensation to the non-linearity pre-compensated data. In various embodiments, the chromatic dispersion may be applied in the frequency domain (e.g., as described with respect to equations 1 and 2), or in the time domain.

The method 1400 includes converting (1410) the chromatic dispersion pre-compensated data from digital domain to analog domain using a digital to analog conversion circuit.

The method 1400 includes using an output of the digital to analog conversion circuit for performing I-Q modulation of a light source (1412). As described herein, the resulting signal may be a double-side band signal and no filtering may be applied to convert the signal to a single side band signal, as is typically performed in prior art techniques to avoid adverse effects of chromatic dispersion.

When performing I-Q modulation, bias circuitry may be used to adjust the I and Q components. One example embodiment is described with respect to FIG. 5. The I and Q components may be processed through their own bias circuitry to adjust for a cosine response typically experienced in modulator implementations. In addition, an additional bias circuit may be used for the Q component to adjust for the phase difference between the I and Q outputs. In some embodiments, the amount of bias in the bias circuitry may be a function of characteristics of the circuitry used to implement the IQ modulation. In some embodiments, the biases may be adjusted during the training phase to improve the linearity of the resulting IQ modulated signal during the training phase. Such adjustment may be reflected in the re-calibration of at least one of the first, the second or the third bias, as shown in FIG. 5.

The method 1400 includes transmitting (1414), over an optical transmission medium, an output signal resulting from the I-Q modulation of the light source. The transmission may be performed using one or several known transmission techniques. The optical transmission medium may be a single mode fiber (SMF).

Figure 15:
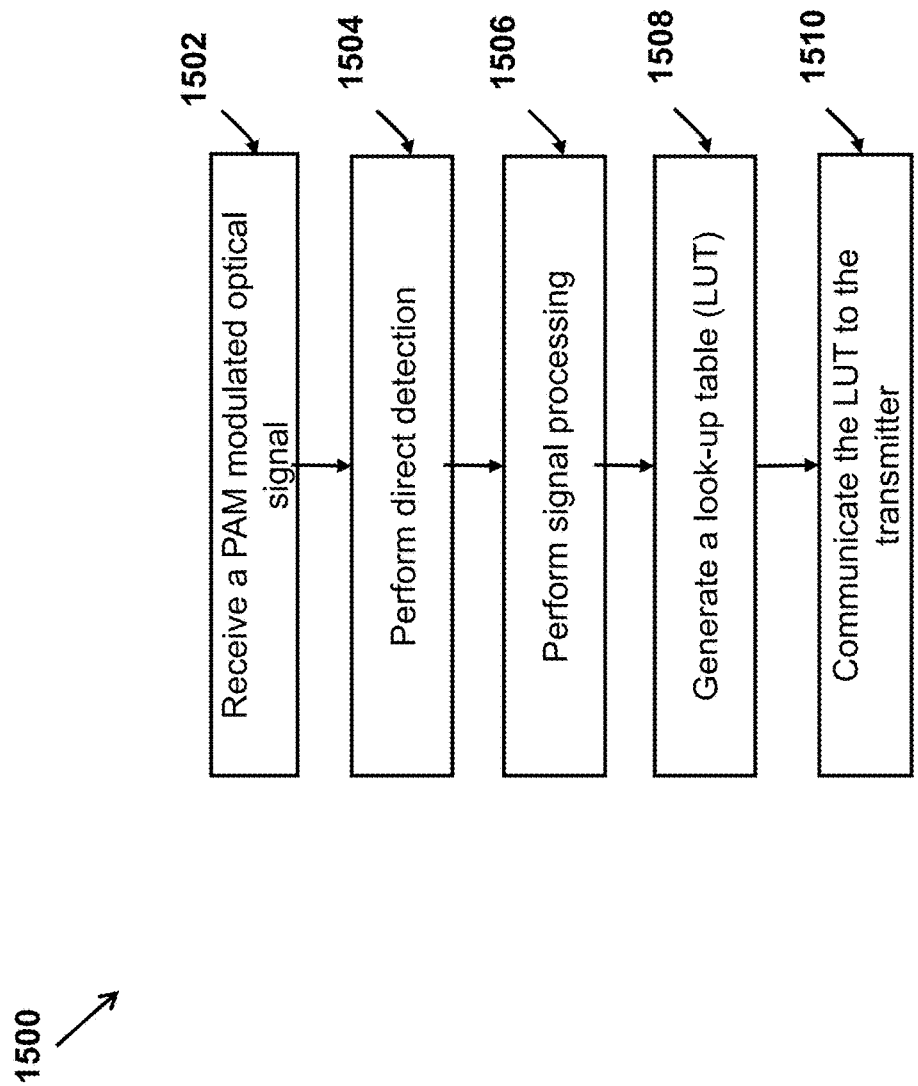
FIG. 15 is a flowchart for an example method of optical communication.

FIG. 15 is a flowchart for an example method 1500 of optical communication. The method includes, during a first stage of operation, receiving (1502) an optical pulse amplitude modulation (PAM) signal, which includes one or more known symbol patterns, from an optical transmitter apparatus over an optical transmission medium, extracting (1504) symbol estimates from the optical PAM signal by performing direct detection, determining (1506) an error component by comparing the symbol estimates with the one or more known symbol patterns, averaging (1508) the error component to build a look-up table indicative of a pre-compensation correction to mitigate the error component, and transmitting (1510) the look-up table to the optical transmitter apparatus.

In some embodiments, the method further includes, during a second stage of operation performed after the first stage of operation, receiving additional optical PAM signals, and extracting information bits from the optical PAM signals. the information bits may be extracted by performing error correction decoding. Examples of the optical PAM signal include an N-level PAM signal, where N is an integer greater than 2.

In some embodiments, an optical communication receiver apparatus is disclosed. The apparatus includes an optical network interface capable of receiving an optical pulse amplitude modulated (PAM) signal and a processor programmed to implement the above-described receiver-side optical communication method using the received optical PAM signal.

Figure 16:
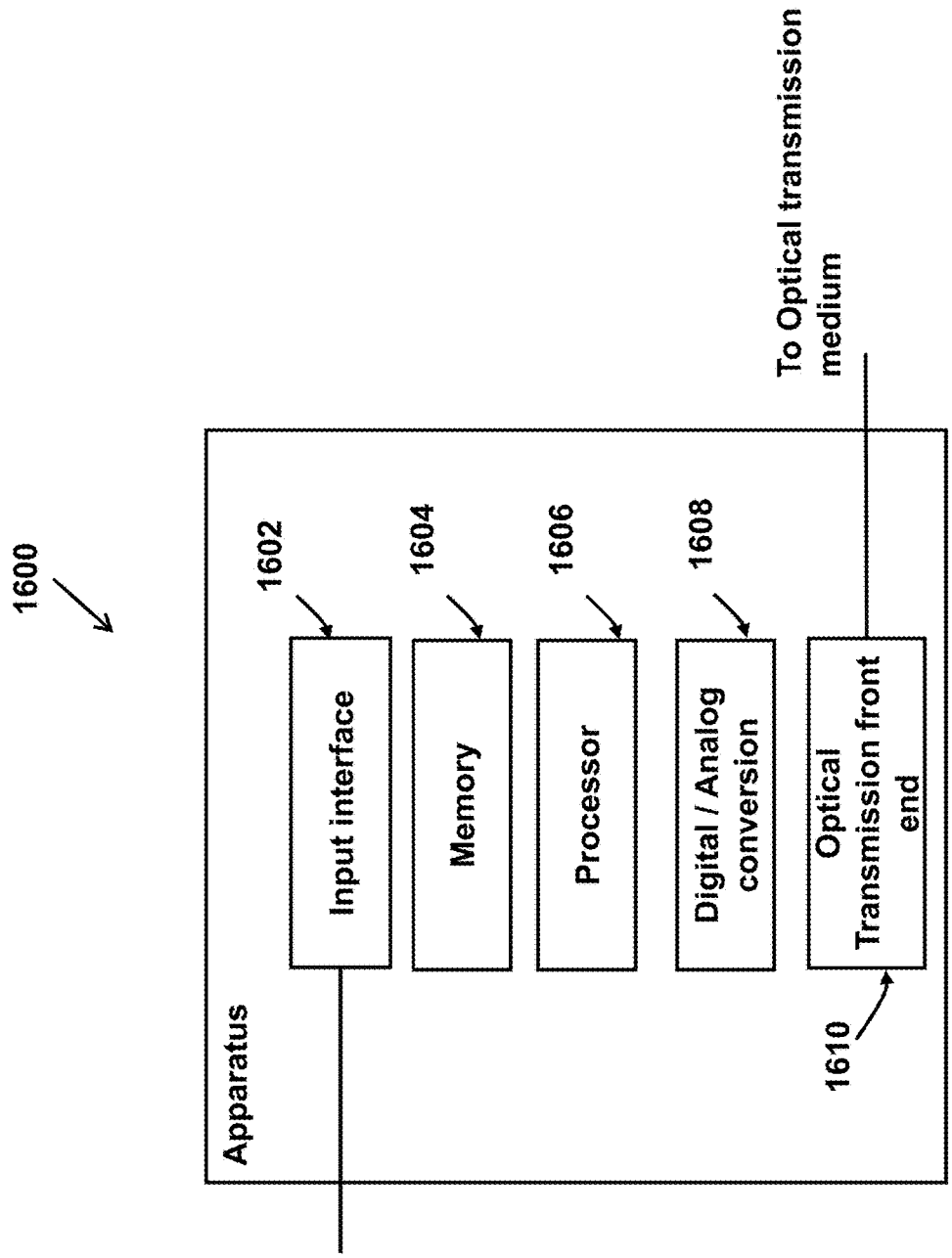
FIG. 16 is a block diagram of an example implementation of an optical transmission apparatus.

FIG. 16 shows an example implementation 1600 of an optical transmission apparatus 1600 that includes an input interface (1602) capable of receiving information bits, a memory (1602) capable of storing instructions and a look-up table, and a processor (1606) capable of reading the instructions from the memory and implementing a method comprising mapping the information bits to a sequence of pulse amplitude modulation (PAM) symbols, generating non-linearity pre-compensated data by applying non-linearity pre-compensation to the sequence of PAM symbols, generating chromatic dispersion pre-compensated data by applying chromatic dispersion pre-compensation to the non-linearity pre-compensated data, a digital to analog conversion circuit (1608) capable of converting the chromatic dispersion pre-compensated data from digital domain to analog domain, an I-Q modulator capable of using an output of the digital to analog conversion circuit for performing I-Q modulation of a light source, and an optical transmission front end (1610) capable of transmitting, over an optical transmission medium, an output signal resulting from the I-Q modulation of the light source.

It will be appreciated that techniques for improving performance of an optical communication system by using pre-compensation are disclosed. In one advantageous aspect, two different pre-compensation stages are used by a transmitter. Data to be transmitted is initially pre-compensated for non-linearity in the transmission path. Subsequent to this pre-compensation, additional chromatic dispersion pre-compensation is applied to take into account chromatic dispersion of the transmitted signal through an optical communication channel.

It will further be appreciated that the non-linearity pre-compensation may be operated based on LUTs that are built during a training phase by averaging over all possible symbol transmission patterns. In some embodiments, the training phase may be continuously ongoing. For example, training sequences may be transmitted from the transmitter at certain times known a priori to both the transmitter and a receiver, thereby continually optimizing the performance of the system. For example, training sequences may be transmitted once every 10 seconds, or at times of days when network data load is low, or when bit error rate is seen to be rising due to transmission inaccuracies, temperature changes and so on. Higher layer signaling between the transmitter and the receiver may be used to facilitate the exchange of training sequences and the corresponding LUTs built by the receiver.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of digital communication, implementable at a transmitter-side in a digital communication network, comprising:
    receiving information bits at an input interface;
    mapping the information bits to a sequence of pulse amplitude modulation (PAM) symbols;
    generating non-linearity pre-compensated data by applying non-linearity pre-compensation to the sequence of PAM symbols;
    generating chromatic dispersion pre-compensated data by applying chromatic dispersion pre-compensation to the non-linearity pre-compensated data;
    converting the chromatic dispersion pre-compensated data from digital domain to analog domain using a digital to analog conversion circuit;
    using an output of the digital to analog conversion circuit for performing I-Q modulation of a light source; and
    transmitting, over an optical transmission medium, an output signal resulting from the I-Q modulation of the light source.

2. The method of claim 1, wherein the applying non-linearity pre-compensation to the sequence of PAM symbols includes:
    identifying, for a given PAM symbol in the sequence of PAM symbols, an index to a look-up table; and
    revising, based on the index, a value of the given PAM symbol.

3. The method of claim 2, wherein the revising the value of the given PAM symbols includes subtracting an error term from the given PAM symbol.

4. The method of claim 2, further including:
generating the look-up table by exchanging messages with a receiver during a training phase; and
storing the look-up table in a local memory.

5. The method of claim 4 wherein the generating the look-up table during the training phase includes:
transmitting, to the receiver, one or more known symbol patterns by performing chromatic dispersion pre-compensation on the known symbol pattern and without performing non-linearity pre-compensation; and
receiving, from the receiver, entries of the look-up table derived by processing the one or more known symbol patterns.

6. The method of claim 1, wherein the applying the chromatic dispersion pre-compensation includes applying the chromatic dispersion pre-compensation in a frequency domain.

7. The method of claim 6, wherein the applying the chromatic dispersion pre-compensation in the frequency domain includes performing an operation represented as:

$$Xc(f) = Xo(f) * H(f)^{-1} = Xo(f) * \exp\left\{-j\frac{\lambda^2}{4\pi c}DL(2\pi f)^2\right\}$$

where f represents frequency, Xc(f) represents spectrum at an output of the chromatic dispersion pre-compensation, Xo(f) represents spectrum at an input to the chromatic dispersion pre-compensation, H is estimated transfer function of the optical transmission medium, $\lambda$ represents wavelength of light, c is the speed of light, D is a dispersion parameter of the optical transmission medium, and L is a length of the optical transmission medium.

8. The method of claim 1, wherein the mapping includes mapping the information bits to an N-level sequence of PAM symbols, where N is an integer greater than 2.

9. The method of claim 1, wherein the performing I-Q modulation of the light source includes generating a double side band PAM signal by performing I-Q modulation of the light source.

10. The method of claim 1, wherein the performing I-Q modulation of the light source includes applying a first bias to an in-phase component of the output of the digital to analog conversion circuit and applying a second bias followed by a third bias to a quadrature component of the output of the digital to analog conversion circuit.

11. The method of claim 10, wherein an amount of at least one of the first bias, the second bias and the third bias is dependent upon an amount of the non-linearity pre-compensation or the chromatic dispersion pre-compensation.

12. An optical communication transmission apparatus, comprising:
an input interface capable of receiving information bits;
a memory capable of storing instructions and a look-up table; and
a processor capable of reading the instructions from the memory and implementing a method, comprising:
mapping the information bits to a sequence of pulse amplitude modulation (PAM) symbols;
generating non-linearity pre-compensated data by applying non-linearity pre-compensation to the sequence of PAM symbols;
generating chromatic dispersion pre-compensated data by applying chromatic dispersion pre-compensation to the non-linearity pre-compensated data;
a digital to analog conversion circuit capable of converting the chromatic dispersion pre-compensated data from digital domain to analog domain;
an I-Q modulator capable of using an output of the digital to analog conversion circuit for performing I-Q modulation of a light source; and
an optical transmission front end capable of transmitting, over an optical transmission medium, an output signal resulting from the I-Q modulation of the light source.

13. The apparatus of claim 12, wherein the applying non-linearity pre-compensation to the sequence of PAM symbols includes identifying, for a given PAM symbol in the sequence of PAM symbols, an index to the look-up table, and revising, based on the index, a value of the given PAM symbol.

14. The apparatus of claim 13, wherein, during a training phase, the look-up table is generated by transmitting, to a receiver communicatively coupled to the optical communication transmission apparatus, one or more known symbol patterns by performing chromatic dispersion pre-compensation on the known symbol pattern and without performing non-linearity pre-compensation, and receiving, from the receiver, entries of the look-up table derived by processing the one or more known symbol patterns.

15. The apparatus of claim 12, wherein the I-Q modulation of the light source is performed by applying a first bias to an in-phase component of the output of the digital to analog conversion circuit and applying a second bias followed by a third bias to a quadrature component of the output of the digital to analog conversion circuit.

16. The apparatus of claim 15, wherein an amount of at least one of the first bias, the second bias and the third bias is dependent upon an amount of the non-linearity pre-compensation or the chromatic dispersion pre-compensation.

17. The method of claim 2, wherein the look-up table is provided to the transmitter-side by an optical receiver by performing a method, comprising:
during a first stage of operation:
receiving the output signal from the transmitter-side;
extracting symbol estimates from the output signal by performing direct detection;
determining an error component by comparing the symbol estimates with a known symbol pattern;
averaging the error component to build the look-up table indicative of a pre-compensation correction to mitigate the error component; and
transmitting the look-up table to the transmitter-side.

18. The method of claim 17, further including:
during a second stage of operation performed after the first stage of operation:
receiving the additional output signal including the revised value of the given PAM symbol; and
extracting information bits from the additional output signal.

19. The method of claim 18, wherein the extracting information bits from the output signal includes performing error correction decoding.

20. The method of claim 17, wherein the output signal comprises an N-level PAM signal, where N is an integer greater than 2.

* * * * *